(12) United States Patent
Lee

(10) Patent No.: US 10,958,978 B2
(45) Date of Patent: Mar. 23, 2021

(54) MEDIA PROCESSING APPARATUS AND CONTROLLING METHOD THEREOF

(71) Applicant: SAMSUNG ELECTRONICS CO., LTD., Suwon-si (KR)

(72) Inventor: Sang-soo Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/996,737

(22) Filed: Jun. 4, 2018

(65) Prior Publication Data

US 2018/0279003 A1    Sep. 27, 2018

Related U.S. Application Data

(63) Continuation of application No. 14/798,574, filed on Jul. 14, 2015, now Pat. No. 9,992,541, which is a
(Continued)

(30) Foreign Application Priority Data

Nov. 27, 2009    (KR) .................. 10-2009-0115860

(51) Int. Cl.
*H04N 21/254* (2011.01)
*H04N 21/4627* (2011.01)
(Continued)

(52) U.S. Cl.
CPC ....... *H04N 21/4627* (2013.01); *G06F 13/385* (2013.01); *H04N 21/2541* (2013.01);
(Continued)

(58) Field of Classification Search
CPC ......... H04N 21/2541; H04N 21/25816; H04N 21/43615
See application file for complete search history.

(56) References Cited

U.S. PATENT DOCUMENTS 5,812,789 A * 9/1998 Diaz ................... H04N 21/4143
709/247
6,741,276 B1    5/2004 Yonezawa
(Continued)

FOREIGN PATENT DOCUMENTS

EP    0949781 A1    10/1999
EP    1189391 A2    3/2002
(Continued)

OTHER PUBLICATIONS

Communication dated Aug. 26, 2014, issued by the Japanes Patent Office in counterpart Japanese Application No. 2010-260171.
(Continued)

*Primary Examiner* — Olugbenga O Idowu
(74) *Attorney, Agent, or Firm* — Sughrue Mion, PLLC

(57) ABSTRACT

A media processing apparatus is provided. The media processing apparatus includes an interface unit which is connected to each of a plurality of terminal devices through a communication interface including a video channel, an audio channel, and a data channel, a processor which receives a control signal from a first terminal device having control rights, a control unit which notifies the first terminal device if there is an access attempt from at least one of a second terminal device and transfers the control rights to the second terminal device if a message to permit the transfer of the control rights is received from the first terminal device. Accordingly, control rights may be transferred and shared in a reasonable manner.

19 Claims, 6 Drawing Sheets

Related U.S. Application Data continuation of application No. 12/907,513, filed on Oct. 19, 2010, now Pat. No. 9,098,639.

(51) Int. Cl.
    *H04N 21/258*      (2011.01)
    *H04N 21/436*      (2011.01)
    *H04N 21/482*      (2011.01)
    *H04N 21/488*      (2011.01)
    *G06F 13/38*      (2006.01)

(52) U.S. Cl.
    CPC . *H04N 21/25816* (2013.01); *H04N 21/43615* (2013.01); *H04N 21/482* (2013.01); *H04N 21/4882* (2013.01)

(56) References Cited

U.S. PATENT DOCUMENTS

| | | | | |
|---|---|---|---|---|
| 7,197,589 | B1* | 3/2007 | Deneroff | G06F 13/364 710/118 |
| 7,916,644 | B2* | 3/2011 | Pularikkal | H04N 21/2385 370/235 |
| 8,225,008 | B2 | 7/2012 | Hong | |
| 2003/0071117 | A1* | 4/2003 | Meade, II | H04N 21/4122 235/382.5 |
| 2005/0202871 | A1* | 9/2005 | Lippincott | A63F 13/235 463/39 |
| 2005/0271040 | A1* | 12/2005 | Schmidt | H04N 21/4882 370/352 |
| 2006/0195873 | A1* | 8/2006 | Gopalan | H04N 21/4383 725/100 |
| 2006/0259924 | A1* | 11/2006 | Boortz | H04N 21/42209 725/32 |
| 2007/0171198 | A1 | 7/2007 | Yokozawa | |
| 2008/0155131 | A1 | 6/2008 | Hong | |

FOREIGN PATENT DOCUMENTS

| | | |
|---|---|---|
| JP | 2005086689 A | 3/2005 |
| JP | 2007194974 A | 8/2007 |
| KR | 1020080057850 A | 6/2008 |
| WO | 2005107367 A2 | 11/2005 |

OTHER PUBLICATIONS

Communication pursuant to Article 93(3) EPC dated Oct. 10, 2013 for EP Application No. 10 189 316.2-1956.
Communication, Issued by the European Patent Office, dated Nov. 12, 2014, In counterpart European Application No. 10 189 315.4.
Extended European Search Report dated Dec. 7, 2011, in counterpart EP Application No. 10 18 9316.
Extended European Search Report dated Dec. 7, 2011 in the corresponding European Patent Application No. 10189315.4.
Communication from the U.S. Patent and Trademark Office dated Jun. 9, 2014 in parent U.S. Appl. No. 12/907,513.
Communication dated Oct. 6, 2015, issued by the Korean Intellectual Property Office in counterpart Korean Application No. 10-2009-0115860.
Communication dated Oct. 30, 2015, issued by the European Patent Office in counterpart European Application No. 15183900.8.

* cited by examiner

MEDIA PROCESSING APPARATUS AND CONTROLLING METHOD THEREOF

CROSS-REFERENCE TO RELATED APPLICATIONS

This application which is a continuation application of U.S. application Ser. No. 14/798,574 filed Jul. 14, 2015 and issued as U.S. Pat. No. 9,992,541 on Jun. 5, 2018, which is a continuation application of U.S. application Ser. No. 12/907,513 filed Oct. 19, 2010 and issued as U.S. Pat. No. 9,098,639 on Aug. 4, 2015, which claims priority from Korean Patent Application No. 10-2009-0115860, filed in the Korean Intellectual Property Office on Nov. 27, 2009, the disclosures of which are incorporated herein by reference in their entireties.

BACKGROUND

1. Field

Apparatuses and methods consistent with the exemplary embodiments relate to a media processing apparatus and a controlling method thereof, and more particularly, to a media control apparatus which is connected to a plurality of terminal devices and allows effective transfer of control rights between the terminal devices and a controlling method thereof.

2. Description of the Related Art

With the development of electronic technology, various types of electronic devices are developed and provided.

In particular, a display device such as a television is placed in almost every room in the house including the living room. However, in most cases, there is only one media processing apparatus which provides a media signal.

Accordingly, a user has to move to a place in which a display device connected to a media processing apparatus is installed in order to view a media signal. To resolve such inconvenience, a media processing apparatus may be connected to each display apparatus so that a media signal which is being reproduced from a media processing apparatus installed in one room (ex. a living room) may be output through a display device installed in another room.

In this case, however, the authority of controlling the operation of a media processing apparatus could be a problem.

If the first user uses a media processing apparatus in a living room and the second user desires to reproduce the media processing apparatus in his or her room at the same time, it should be determined to which user the authority of the media processing apparatus will be granted. If the second user is allowed to control the media processing apparatus while the first use is still using the apparatus, the use of the first user who is the initial user, may be unintentionally disturbed. On the other hand, if the second user is not allowed to control the media processing apparatus until the first user completes using the apparatus, this may inconvenience the second user.

Accordingly, a method for determining and sharing the authority of controlling the media processing apparatus when a plurality of terminal devices are connected to the media processing apparatus is required.

SUMMARY

Accordingly, an aspect of one or more exemplary embodiments is to provide a media processing apparatus which enhances user convenience by granting authority and sharing the control of the media processing apparatus and a controlling method thereof.

According to an aspect of one or more exemplary embodiments, a media processing apparatus is provided. The media processing apparatus includes a processor which receives a control signal from a first terminal device having control rights, and a control unit which notifies the first terminal device if an access attempt is made by at least one second terminal device and transfers the control rights to the second terminal device if a message to permit transfer of the control rights is received from the first terminal device.

The control unit may determine that the first terminal device refuses to transfer the control rights if a predetermined period of time elapses after the notification.

The control unit may transmit an error message to the second terminal device if the control unit determines that the first terminal device refuses to transfer the control rights.

The control unit may transmit an error message to the second terminal device if a message to refuse transfer of the control rights is received from the first terminal device.

The control unit may transfer the control rights to the second terminal device if an event which deprives the first terminal device of the control rights occurs.

The media processing apparatus may further include a storage unit, and the control unit may set priority of terminal devices based on an order of access attempts if a number of terminal devices attempt to access the media processing apparatus, may store the priority in the storage unit, and, if an event which deprives the terminal device of the control rights occurs, the control unit sequentially transfers the control rights to a next terminal device based on the priority.

The event may be at least one of a first event in which the terminal device having the control rights is turned off, a second event in which the connection between the terminal device having the control rights and the media processing apparatus is cut off, and a third event in which the terminal device having the control rights terminates use of the media processing apparatus.

The control unit may transfer the control rights to a third terminal device if there is an access attempt from the third terminal device which is set to be in a master mode.

According to another aspect of one or more exemplary embodiments, a method for controlling a media processing apparatus is provided. The method includes transmitting from a first terminal device having control rights a control signal, notifying the first terminal device if an access attempt is made by at least one second terminal device, and transferring the control rights to the second terminal device if the first terminal device allows transfer of the control rights.

The method may further include transmitting an error message to the second terminal device if a predetermined period of time elapses after the notifying.

The method may further include transmitting an error message to the second terminal device if a message informing refusal of transfer of the control rights is received by the first terminal device.

The method may further include transferring the control rights to the second terminal device if an event for depriving the first terminal device of the control rights occurs.

The method may further include setting priority of terminal devices based on an order of access attempts if a plurality of terminal devices attempt to access the media processing apparatus and sequentially transferring the control rights to a next terminal device based on the priority if an event for depriving the control rights from a terminal device having the control rights occurs.

The event may be at least one of a first event where a terminal device having the control rights is turned off, a second event where connection between the terminal device having the control rights and the media processing apparatus is cut off, and a third event where the terminal device having the control rights terminates use of the media processing apparatus.

The method may further include transferring the control rights to a third terminal device if there is an access attempt from the third terminal device which is set to be in a master mode.

BRIEF DESCRIPTION OF THE DRAWINGS

The above and/or other aspects of the present disclosure will be more apparent by describing certain exemplary embodiments with reference to the accompanying drawings, in which.

DETAILED DESCRIPTION OF EXEMPLARY EMBODIMENTS

Figure 1:
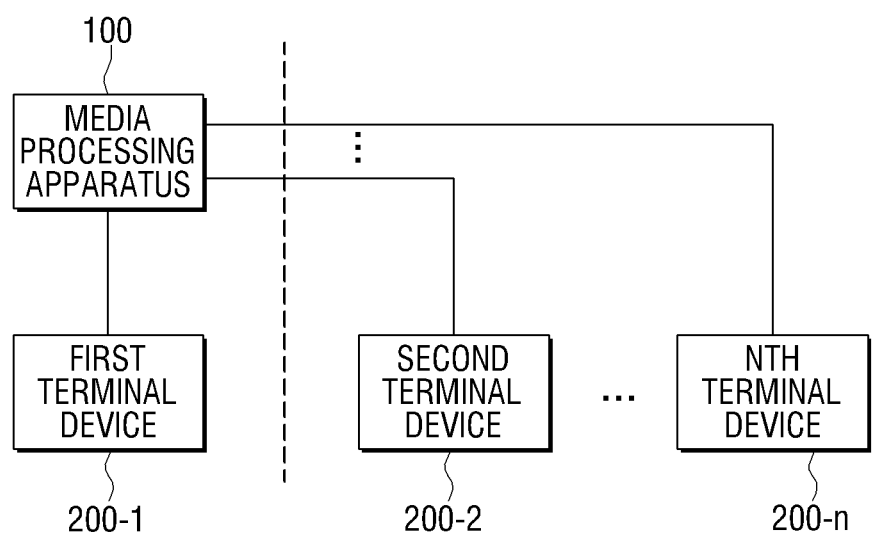
FIG. 1 is a view illustrating the configuration of a system according to an exemplary embodiment.

Certain exemplary embodiments are described in greater detail below with reference to the accompanying drawings.

In the following description, analogous drawing reference numerals are used for analogous elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Referring to FIG. 1, an exemplary system includes a media processing apparatus 100 and a plurality of terminal devices 200-1, 200-2, . . . , 200-*n*.

The terminal devices 200-1, 200-2, . . . , 200-*n* in FIG. 1 may be various kinds of devices which may output video or audio, such as television, PC, monitor, electronic frame, notebook computer, audio player, or speaker.

The media processing apparatus 100 represents an apparatus which may output a media signal from various sources. Specifically, the media processing apparatus 100 may be a DVD player, a Blu-ray disk player, a VCR, an audio player, or an MP3 player which reads out data from various types of storage media and reproduces a media signal, or a set-top box which receives and processes a broadcast signal.

The media signal means a signal which includes at least one of a video signal and an audio signal, such as a television broadcast signal, a DVD reproduction signal, a Blu-ray disk reproduction signal, an audio signal, a VCR reproduction signal, and photo image data.

A communication interface between each of the plurality of terminal devices 200-1, 200-2, . . . , 200-*n* and the media processing apparatus 100 is an interface including a video channel, an audio channel, and a data channel.

The video channel and the audio channel are interfaces to transmit/receive a video signal and an audio signal respectively, and the data channel is an interface to transmit/receive various data such as a control signal, a synchronization signal, USB data and an Ethernet signal.

Specifically, the communication interface between each of the plurality of terminal devices 200-1, 200-2, . . . , 200-*n* and the media processing apparatus 100 may be realized as an S-link interface.

The S-link interface is an interface which extends the function of High-Definition Multimedia Interface (HDMI). The HDMI is a standard to make it more convenient to use AV by transmitting a video/audio signal together with a control signal while maintaining compatibility with a DVI. The S-link interface has characteristics similar to those of the HDMI.

Each of the first terminal device 200-1 and the second terminal device 200-2 is connected to the media processing apparatus 100, and thus the user of the first terminal device 200-1 and the second terminal device 200-2 may control the operation of the medial processing apparatus 100 to receive a media signal. In this case, the user who starts using the device first or who has priority may have the control rights. The user who does not have the control rights may be allowed only to output a media signal provided by the media processing apparatus 100 or may not use the media processing apparatus 100 at all.

As an example, the user of the first terminal device 200-1 may input a control signal for the media processing apparatus 100. If the media processing apparatus 100 is a DVD player, the user may input a reproduction command by selecting a reproduction button.

In this case, the user using the first terminal device 200-1 and the media processing apparatus 100 may input a control signal by manipulating a key provided on each of the main body of the first terminal device 200-1 or the media processing apparatus 100 or a remote controller.

If the first terminal device 200-1, not the media processing apparatus 100, is manipulated by a remote controller or a key formed on the main body of the first terminal device, the first terminal device 200-1 transmits the control signal input through a data channel connected to the media processing apparatus 100. In this case, the control signal itself may be forwarded, or the control signal may be converted into a control command in a format corresponding to the media processing apparatus 100 and then transmitted. Such a control command will be regarded as a control command in the description below.

The media processing apparatus 100 performs operation corresponding to the received control command, and if a media signal is generated as a result, transmits the generated media signal to the first terminal device 200-1 using at least one of a video channel and an audio channel. Specifically, if the media signal is a moving image, both a video channel and an audio channel may be used, if the media signal is composed of an audio signal, only an audio channel may be used, and if the media signal is composed of a video signal, such as a photo to be displayed on an electronic frame, only a video channel may be used.

Generally, the terminal device which transmits a control signal to use the media processing apparatus 100 among the plurality of terminal devices **200-1, 200-2, . . . , 200-*n*** has control rights, but this is not always the case.

If a user sets priority of the plurality of terminal devices **200-1, 200-2, . . . , 200-*n*** in advance, the control rights may be given to the terminal devices based on the set priority. The terminal device having a lower priority may have the controlling power only when the terminal device having a higher priority is turned off or its connection with the media processing apparatus is cut off.

If the first terminal device 200-1 has the control rights, and another terminal device, for example, the second terminal device 200-2 receives a control signal from a user, the second terminal device 200-2 transmits a control command to the media processing apparatus 100.

Subsequently, the media processing apparatus 100 recognizes the existence of the first terminal device 200-1 which is in use, and transmits an alarm message to the first terminal device 200-1. The alarm message may be transmitted via a data channel, a video channel or an audio channel according to an exemplary embodiment.

If the media processing apparatus 100 is transmitting a video signal to the first terminal device 200-1, the media processing apparatus 100 renders the alarm message and multiplexes the rendered image, that is, the alarm message, with the video signal. Subsequently, the media processing apparatus 100 transmits the video signal including the alarm message to the first terminal device 200-1. The first terminal device 200-1 may provide the alarm message by performing scaling on the video signal transmitted from the media processing apparatus 100 and outputting it on the screen. The alarm message may include a message to inform that there is an attempt by another user to use the media processing apparatus 100, a message to ask whether or not to allow another user to view a media signal, and a message to ask whether or not to transfer control rights to another user. The message may be provided as a text in various fonts or an image.

The media processing apparatus 100 may generate an alarm message as an audio message, multiplex it with an audio signal, and provides it to the first terminal device 200-1 via an audio channel. Such an alarm message may be output through a speaker.

In addition, the media processing apparatus 100 may provide an alarm message to the first terminal device 200-1 via a data channel. That is, the media processing apparatus 100 may provide a command to display the alarm message or data regarding the alarm message to the first terminal apparatus 200-1. Accordingly, the first terminal device 200-1 may convert the alarm message into an On Screen Display (OSD), a rendering image, or an audio message and output it.

The media processing apparatus 100 may include information regarding the second terminal device 200-2 in an alarming message. Accordingly, the first terminal device 200-1 may also be provided with information regarding which device attempts to use the media processing apparatus 100.

Figure 2:
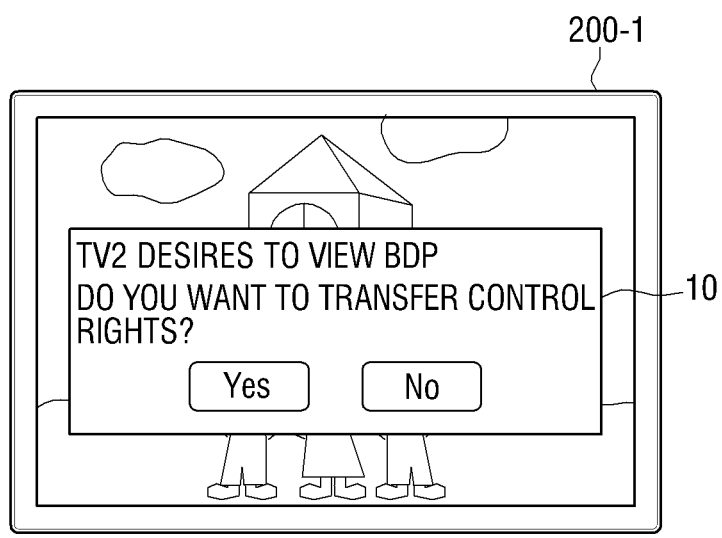
FIG. 2 is a view illustrating an example of a message inquiring authority transfer in a system according to an exemplary embodiment.

FIG. 2 is a view illustrating an example of a message displayed on the first terminal device 200-1 according to an exemplary embodiment. In FIG. 2, the first terminal device 200-1 and the second terminal device 200-2 are televisions, and the media processing apparatus 100 is a Blu-ray Disk Player (BDP). As illustrated in FIG. 2, the second terminal device 200-2 may inform the first terminal device 200-1, that is, TV1, that it attempts to access the media processing apparatus, that is, the BDP, and display an alarm message 10 on the first terminal device 200-1 which asks whether to transfer control rights to the second terminal device 200-2.

The user of the first terminal device 200-1 may select 'Yes' or 'NO' by manipulating a remote controller or a key formed on the main body. If the user selects 'Yes', a message to allow the transfer of the control rights is generated and transmitted to the media processing apparatus 100. Accordingly, the media processing apparatus 100 grants the second terminal device 200-2 the control rights. Once the control rights are transferred, the media processing apparatus 100 performs operation according to a control signal transmitted from the second terminal device 200-2.

If the user does not select 'Yes' or 'No', or selects 'No', the first terminal device 200-1 may perceive it as a refusal to transfer the control rights and transmit a message informing of the refusal of the transfer of the control rights to the media processing apparatus 100. If the message informing the refusal of the transfer of the control rights is received or no message is received for a predetermined period of time after the alarm message is transmitted to the first terminal device 200-1, the media processing apparatus 100 may perceive it as a refusal to transfer the control rights and transmit an error message to the second terminal device 200-2. The error message may include information that the second terminal device 200-2 does not have the control rights and information about which terminal currently possesses the control rights. Such an error message may be transmitted to the second terminal device 200-2 via a data channel connected to the second terminal device 200-2. The second terminal device 200-2 may transmit the received error message in a form of a video message or an audio message and output it.

FIG. 2 illustrates an alarm message which asks whether to transfer the control rights according to an exemplary embodiment, but the media processing apparatus 100 may output an alarm message which asks whether to continue to provide a media signal to the first terminal device 200-1. If a selection signal for providing the media signal is received from a user using the first terminal device 200-1, the media processing apparatus 100 may provide the same signal as the one provided to the first terminal device 200-1 to the second terminal device 200-2. However, if the first terminal device 200-1 sends no response or expresses refusal to use the media processing apparatus 100, no signal may be transmitted to the second terminal device 200-2.

In another exemplary embodiment, a media signal may be provided to the second terminal device 200-2 without permission from the first terminal device 200-1. However, as long as the first terminal device 200-1 possesses the control rights, the second terminal device 200-2 may not control the operation of the media processing apparatus 100.

The media processing apparatus 100 may transfer control rights to the second terminal device 200-2, if there is an event which cancels the control rights of the first terminal device 200-1.

Such an event may be set in various occasions. For example, the media processing apparatus 100 transfers control rights to the second terminal device 200-2 if one of the following events occurs: the first event in which the first terminal device 200-1 is turned off, the second event in which the connection between the first terminal device 200-1 and the media processing apparatus 100 is cut off, and the third event in which the first terminal device 200-1 terminates the use of the media processing apparatus.

The media processing apparatus 100 may determine whether the first event or the second event occurs by periodically monitoring the state of the first terminal device

200-1. That is, the media processing apparatus 100 may periodically transmit a query to the first terminal device 200-1 through a data channel and determine that the first event or the second event occurs if no corresponding acknowledgement is received.

The media processing apparatus 100 may determine whether or not the third event occurs by determining whether a certain kind of control signal is received from the first terminal device 200-1. That is, if a command to stop reproducing a media signal or a command to turn off the media processing apparatus 100 is received, it is determined that the media processing apparatus 100 will no longer be in use, and the control rights may be transferred to the second terminal device 200-2.

In the above exemplary description, control rights transfer only between the first terminal device 200-1 and the second terminal device 200-2 and the media processing apparatus 100 is explained. However, if there are other terminal devices, control rights may be transferred in an analogous way to other terminal devices. If more than three terminal devices transmit a control signal to the media processing apparatus 100, the media processing apparatus 100 may grant priority based on the order of access, that is, the order of transmitting the control signal. Accordingly, if the first terminal device 200-1 loses its control rights, the media processing apparatus 100 transfers the control rights to the terminal device having the next priority, and so on.

If more than two subsequent terminal devices attempt to access the media processing apparatus 100, the media processing apparatus 100 may transmit an alarm message including information on each terminal device to the first terminal device 200-1. Accordingly, the first terminal device 200-1 may select a terminal which will receive control rights from among a plurality of terminal devices. The information regarding the selected terminal device may be transmitted to the media processing apparatus 100 via a data channel, and the media processing apparatus 100 may transfer control rights to the terminal device according to the received information.

On the other hand, if there is a terminal device which operates in a master mode from among a plurality of terminal devices 200-1, 200-2, . . . , 200-n, the terminal device may be set to have control rights. The master mode represents a mode where a password or an ID of a user or an administrator may be set and registered, and thus the master mode has absolute authority regardless of an access order. If there is a terminal device which operates in the master mode, other terminal devices may user the media processing apparatus only under the control of the terminal mode in the master mode.

For instance, suppose that the second terminal device 200-2 operates in the master mode in the system illustrated in FIG. 1. In this case, even if the first terminal device 200-1 has control rights, the control rights are immediately transferred to the second terminal device 200-2 if the second terminal device 200-2 inputs a certain selection signal, or simply, the second terminal device 200-2 is turned on. Whether to transfer the control rights is determined by the media processing apparatus 100. Once authentication information necessary to acknowledge a terminal device as the terminal device in the master mode is received from the second terminal device 200-2, the media processing apparatus 100 checks whether the received authentication information is consistent with pre-registered authentication information. Upon confirming that the received authentication information is consistent with the pre-registered authentication information, the second terminal device 200-2 is recognized as the terminal device in the master mode, and other terminal devices operate only according to the control signal input by the second terminal device 200-2. In this case, a message informing of the appearance of the terminal device which operates in the master mode may be provided to other terminal devices. The authentication information includes an ID or a password pre-registered by a user, or any information which may identify the user.

In order to support the master mode, the media processing apparatus 100 may store authentication information and user interface (UI) information for setting the master mode. Every time that a control signal is transmitted from each terminal device, the media processing apparatus 100 may ask a user whether or not to enter the master mode by providing UI information inquiring whether or not to set a master mode to the terminal device which transmits the control signal.

Figure 3:
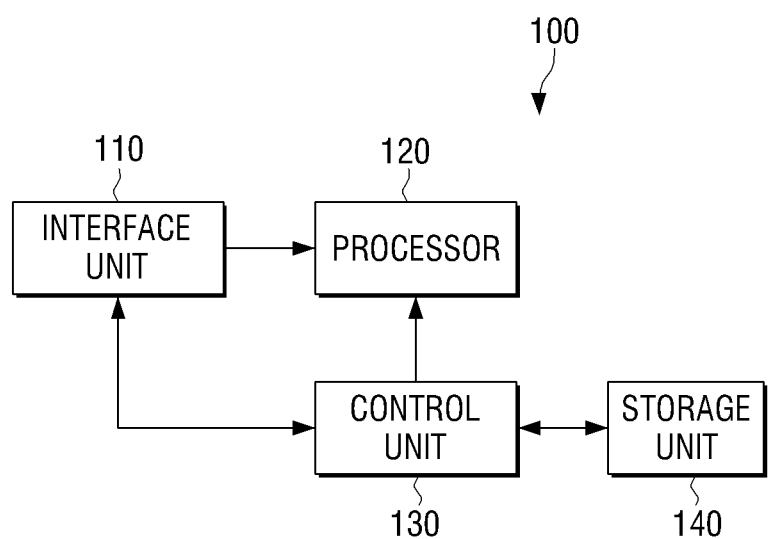
FIG. 3 is a block diagram illustrating the configuration of a media processing apparatus according to an exemplary embodiment.

FIG. 3 is a block diagram illustrating the configuration of the media processing apparatus 100 according to an exemplary embodiment.

Referring to FIG. 3, the media processing apparatus 100 comprises an interface unit 110, a processor 120, a control unit 130, and a storage unit 140. FIG. 3 illustrates only the minimum number of elements necessary to explain the technical feature of an exemplary embodiment, and thus other elements may be further included depending on the apparatus type of the media processing apparatus 100.

For instance, if the media processing apparatus 100 is realized as a broadcast reception apparatus such as a set-top box, the media processing apparatus 100 may further include a turner, demodulator, and equalizer. The control unit 130 may control the turner to select a broadcast signal in a desired frequency bandwidth. The selected broadcast signal may be demodulated and equalized by the demodulator and the equalizer respectively, and then processed to become a media signal in a format corresponding to each terminal device by the processor 120.

Alternatively, if the media processing apparatus is realized as a media reproducing apparatus which reproduces data stored in a storage medium such as a DVD player, Blu-ray disk player, or a VCR, the media processing apparatus 100 may further comprise a mounting unit which mounts the storage medium and a reader which reads out data recorded in the mounted storage medium. The data may be converted to a media signal in a format corresponding to each terminal device.

The operation and configuration of the above exemplary elements have been explained above, and thus no further description will be provided.

The interface unit 110 is connected to each terminal device 200-1, 200-2, . . . , 200-n (depicted in FIG. 1) via a communication interface including a video channel, an audio channel, and a data channel.

The processor 120 performs operation according to a control signal received from the terminal device having control rights from among a plurality of terminal devices. Specifically, the processor may perform signal conversion under the control of the control unit 130 which receives a control signal. For instance, if a media reproduction signal is input, the media signal is generated by detecting data from an external broadcast station or a connected storage medium.

The control unit 130 transfers control rights according to the order of access attempts by each terminal device. That is, if there is an access attempt from at least one of the second terminal device from among a plurality of terminal devices, the first terminal device, which currently has the control rights, is notified of the access attempt. Such notification may be delivered using various kinds of alarm message as explained above. On the other hand, a message informing that the first terminal device has the control rights may be transmitted to the second terminal device that requests access.

Subsequently, if a message allowing control rights transfer is received from the first terminal device, the control unit 130 transfers the control rights to the second terminal device. That is, operation is then performed according to the control signal input from the second terminal device.

However, if a message refusing to transfer control rights is received from the first terminal device, or no message is received from the first terminal device for a predetermined period of time, the control unit 130 does not transfer control rights to the second terminal device. In this case, the control unit 130 may transmit an error message to the second terminal device.

If the first terminal device does not transfer control rights, the control unit 130 may periodically monitor whether an event for forfeiting the control rights of the first terminal device occurs. If power is turned off or connection is cut off while the first terminal device does not transfer the control rights, or a specific command to terminate control is transmitted from the first terminal device, the control unit 130 transfers the control rights to the second terminal device. In this case, a message informing that the control rights have been transferred to the second terminal device may be transmitted to the second terminal device so that a user knows that the media processing apparatus 100 is now controllable by the second terminal device.

If there is an access attempt from the third terminal device which is set to be in a master mode, or the second terminal device which has attempted to access but was denied, is set to be in the master mode, the control rights are immediately transferred to the third terminal device or the second terminal device that is set to be in the master mode. In this case, a message informing that the control rights are no longer available may be transmitted to the first terminal device.

The storage unit 140 may store various kinds of data. Specifically, the storage unit 140 may store rendering data to visualize various messages, authentication information pre-registered to set a master mode, and information regarding priority given to each terminal device. FIG. 3 illustrates only one storage unit 140, but the number, the type, and the location of the storage unit 140 may vary according to an exemplary embodiment.

If a plurality of terminal devices attempt to access the media processing apparatus 100, the control unit 130 may set priority of the terminal devices based on the order of access attempts and store data regarding the priority in the storage unit 140. Accordingly, if an event where the first terminal device loses the control rights occurs, the control rights are transferred to the next terminal device based on the priority stored in the storage unit 140.

Figure 4:
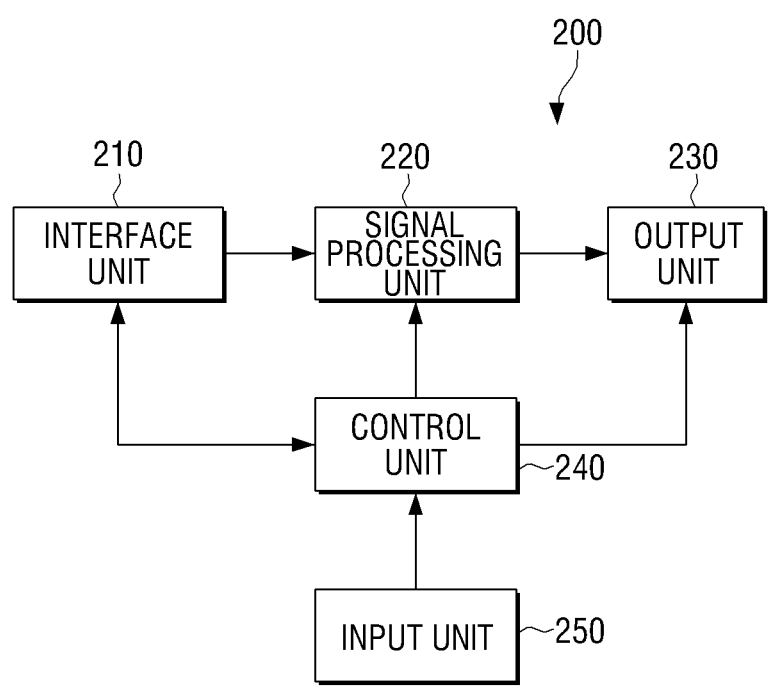
FIG. 4 is a block diagram illustrating the configuration of a terminal device according to an exemplary embodiment.

FIG. 4 is a block diagram illustrating the configuration of a terminal device according to an exemplary embodiment. Each terminal device 200-1, 200-2, . . . , 200-n illustrated in the system of FIG. 1 may have an analogous configuration as that of the exemplary terminal device 200 illustrated in FIG. 4.

Referring to FIG. 4, the terminal device 200 comprises an interface unit 210, a signal processing unit 220, an output unit 230, a control unit 240, and an input unit 250.

The interface unit 210 may be connected to the interface unit 110 of the media processing apparatus 110 (shown in FIG. 3) via a communication interface including a video channel, an audio channel, and a data channel.

The signal processing unit 220 converts the media signal transmitted through the interface unit 210 into an appropriate output format, and the output unit 230 outputs the converted data on a screen or through a speaker. Accordingly, a user may view various types of media signals.

The control unit 240 controls the operation of each element in the terminal device 200, and the input unit 250 receives a selection signal input from a user and transmits the signal to the control unit 240.

The user of the terminal device 200 may input a control signal for the media processing apparatus 100 by manipulating a remote controller or a key formed on the main body of the terminal device 200.

The input unit 250 transmits the input control signal to the control unit 240.

The control unit 240 reconfigures the received control signal to a control signal in a format corresponding to the media processing apparatus 100 and then transmits the reconfigured signal to the interface unit 210.

Accordingly, control rights of the terminal device 200 may be granted for the first time by the media processing apparatus 100 or may be transferred. If an alarm message or an error message is transmitted from the media processing apparatus 100, the control unit 240 controls the signal processing unit 220 and the output unit 230 to output the transmitted message. In this case, if the media processing apparatus 100 multiplexes the message with a video signal or an audio signal itself, the message may be output while the received media signal is processed. On the other hand, if the media processing apparatus 100 transmits the message data through a data channel, the signal processing unit 220 may output the data by rendering the message data or converting the data into an audio message.

Figure 5:
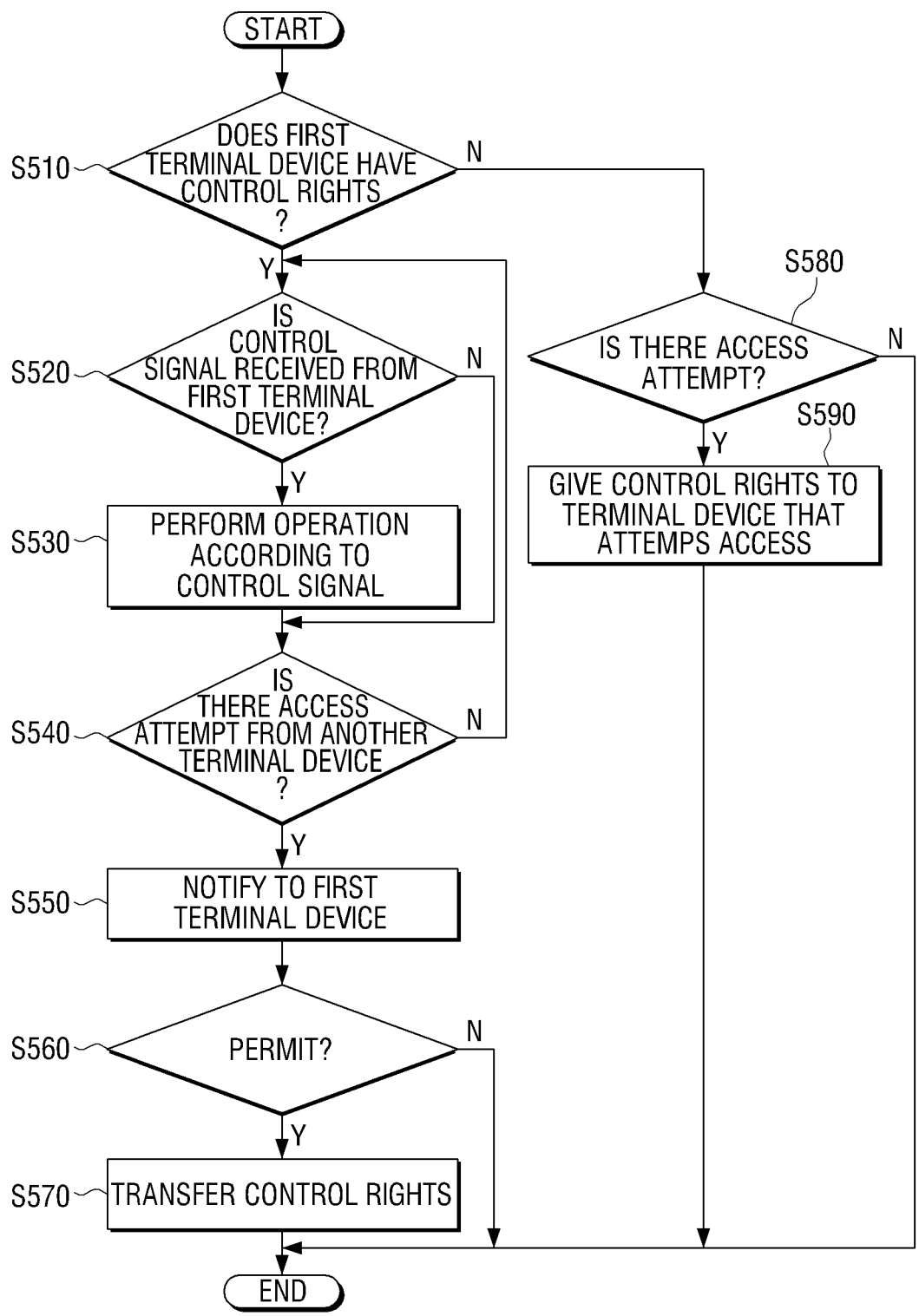
FIG. 5 is a flowchart explaining a method for controlling a media processing apparatus according to an exemplary embodiment.

FIG. 5 is a flowchart provided to explain a method for controlling a media processing apparatus according to an exemplary embodiment. Referring to FIG. 5, if there is the first terminal device having control rights (S510: Y), and a control signal is received from the first terminal device (S520: Y), operation is performed according to the control signal (S530). In this case, the first terminal device having the control rights refers to a terminal device which operates in a master mode, or a terminal device which has transmitted a control signal.

If there is an access attempt from another terminal device (S540), the first terminal device is notified (S550), and it is determined whether the first terminal device gives permission to transfer control rights to the second terminal device (S560). If the permission by the first terminal device is confirmed, the control rights are transferred to another terminal device (S570), and operation is performed according to the control signal from another terminal device from that time on.

If there is no first terminal device having control rights, the control rights are given to the terminal device who attempts to access the apparatus for the first time (S580, S590).

Accordingly, control rights may be granted and shared in a reasonable manner.

Although not illustrated in FIG. 5 in detail, the third terminal device which operates in a master mode may appear. In this case, the third terminal device has control rights regardless of the permission by the first terminal device. That is, if a control signal is transmitted from the third terminal device which is preset to be in a master mode, or the second terminal device is set to be in a master mode, the media processing apparatus 100 operates according to the control signal from the third or the second terminal device instead of the first terminal device. In this case, a message informing of the appearance of the terminal device which operates in the master mode, may be provided to the first terminal device.

Figure 6:
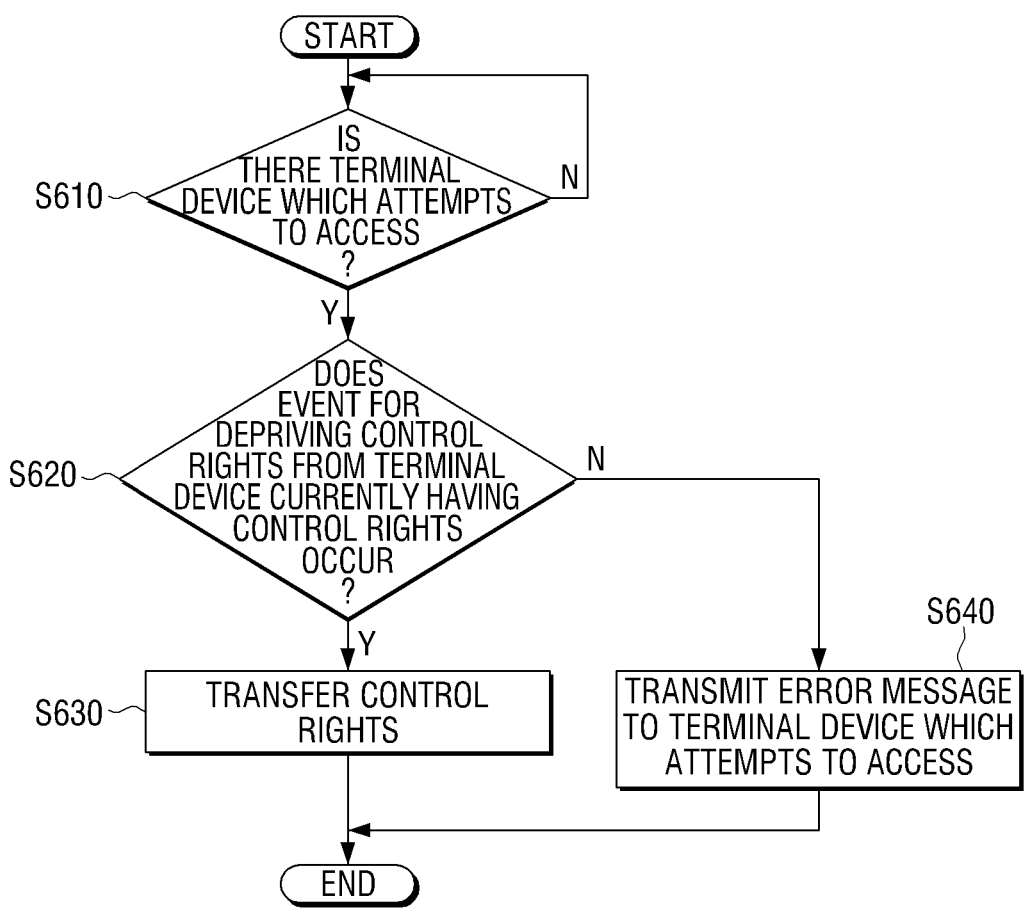
FIG. 6 is a flowchart explaining a method for determining whether to transfer control rights of a media processing apparatus according to an exemplary embodiment.

FIG. 6 is a flowchart explaining a method for transferring control rights in the media processing apparatus according to an exemplary embodiment.

Referring to FIG. 6, if there is an access attempt from a terminal device (S610), it is determined whether there is an event for depriving control rights from the terminal device which currently has the control rights (S620). Such an event includes the case in which the first terminal device having the control rights agrees to transfer the control rights to another terminal device as illustrated for example in FIG. 5. The event also includes turning the power off, cutting the connection off, and exiting the apparatus.

Subsequently, if it is determined that event for depriving control rights from the terminal device which currently has the control rights occurs, the control rights are transferred to the terminal device which newly attempts to access the apparatus (S630). In this case, a message informing the transfer of the control rights to, for example, the second terminal device 200-2, may be transmitted to all terminal devices connected to the media processing apparatus 100.

If the above event does not occur, the media processing apparatus 100 transmits an error message to the terminal device which attempts to access the apparatus (S640). In this case, the error message may include various messages such as requesting the device to be on a standby until the first terminal device ends the use of the apparatus.

According to the above various exemplary embodiments, control rights may be transferred and shared in a reasonable manner among a plurality of terminal devices.

Although a few exemplary embodiments have been shown and described, it would be appreciated by those skilled in the art that changes may be made without departing from the principles and spirit of the invention, the scope of which is defined in the claims and their equivalents.

What is claimed is:

1. An electronic apparatus, comprising:
    a communicator configured to communicate with a plurality of external devices comprising a first external device which obtains a control right for controlling operation of the electronic apparatus and a second external device which is different from the first external device;
    a processor configured to:
        based on a media signal corresponding to a content being received, process the media signal for playing the content,
        based on a first control signal being received from the first external device while the media signal corresponding to the content is processed, perform an operation corresponding to the received first control signal,
        based on an access signal to connect the second external device to the electronic apparatus being received from the second external device while the media signal corresponding to the content is processed and the first external device has the control right for controlling the operation of the electronic apparatus, transmit information corresponding to the content, to the second external device which obtains the control right for controlling the operation of the electronic apparatus according to the access signal, and
        based on a second control signal being received from the first external device or the second external device, perform an operation corresponding to the received second control signal.

2. The electronic apparatus as claimed in claim 1, wherein the processor is further configured to:
    based on the access signal to connect the second external device being received from the second external device while the media signal corresponding to the content is processed, transmit the control right to the second external device according to the access signal, and
    transmit the information corresponding to the content to the second external device.

3. The electronic apparatus as claimed in claim 1, wherein the processor is configured to:
    periodically monitor an event in which the control right of the first external device is lost, and
    based on the event occurring, transmit the control right to the second external device, and
    wherein the event includes at least one of an event in which power of the first external device is turned off, an event in which connection between the first external device and the electronic apparatus is cut off and an event in which the first external device terminates use of the electronic apparatus.

4. The electronic apparatus as claimed in claim 3, wherein the processor is configured to periodically transmit a query to the first external device, and
    wherein the processor is configured to identify whether the event occurs based on a response to the transmitted query, or based on a signal received from the first external device.

5. The electronic apparatus as claimed in claim 1, wherein the processor is configured to:
    transmit, to the first external device, a notification message inquiring whether to transmit the control right to the second external device based on the access signal from the second external device, and
    based on a message to approve a transmission of the control right being received from the first external device, transmit the control right to the second external device.

6. The electronic apparatus as claimed in claim 3, wherein the processor is configured to:
    transmit, to the first external device, a notification message inquiring whether to transmit the control right to the second external device based on the access signal from the second external device, and
    based on a message to refuse a transmission of the control right being received from the first external device, periodically monitor the event in which the control right of the first external device is lost.

7. The electronic apparatus as claimed in claim 6, wherein the processor is configured to, based on the message to refuse the transmission of the control right being received from the first external device, transmit an error message to the second external device.

8. The electronic apparatus as claimed in claim 1, wherein the processor is configured to:
    based on a plurality of access signals to connect the plurality of external devices being received from, the plurality of external devices while the media signal corresponding to the content is processed, set priority to the plurality of external devices in order by a reception time of the plurality of access signals, and
    based on an event in which an external device which currently has a control right loses the control right occurring, transmit the control right to an external device of a subsequent rank according to the priority.

9. A method for controlling an electronic apparatus to communicate with a plurality of external devices comprising a first external device which obtains a control right for controlling operation of the electronic apparatus and a second external device which is different from the first external device, the method comprising:
based on a media signal corresponding to a content being received, processing the media signal for playing the content,
based on a first control signal being received from the first external device while the media signal corresponding to the content is processed, performing an operation corresponding to the received first control signal;
based on an access signal to connect the second external device to the electronic apparatus being received from the second external device while the media signal corresponding to the content is processed and the first external device has the control right for controlling the operation of the electronic apparatus, transmitting information corresponding to the content, to the second external device which obtains the control right for controlling the operation of the electronic apparatus according to the access signal; and
based on a second control signal being received from the first external device or the second external device, performing an operation corresponding to the received second control signal.

10. The method as claimed in claim 9, wherein the transmitting the information comprises:
based on the access signal to connect the second external device being received from the second external device while the media signal corresponding to the content is processed, transmitting the control right to the second external device according to the access signal; and
transmitting the information corresponding to the content to the second external device.

11. The method as claimed in claim 9, wherein the transmitting the information comprises:
periodically monitoring an event in which the control right of the first external device is lost; and
based on the event occurring, transmitting the control right to the second external device according to the access signal, and
wherein the event includes at least one of an event in which power of the first external device is turned off, an event in which connection between the first external device and the electronic apparatus is cut off and an event in which the first external device terminates use of the electronic apparatus.

12. The method as claimed in claim 11, wherein the transmitting the information comprises:
transmitting a query to the first external device;
identifying whether the event occurs based on a response to the transmitted query, or based on a signal received from the first external device.

13. The method as claimed in claim 9, wherein the transmitting the information comprises:
transmitting, to the first external device, a notification message inquiring whether to transmit the control right to the second external device based on the access signal from the second external device; and
based on a message to approve a transmission of the control right being received from the first external device, transmitting the control right to the second external device.

14. The method as claimed in claim 11, wherein the transmitting the information comprises:
transmitting, to the first external device, a notification message inquiring whether to transmit the control right to the second external device based on the access signal from the second external device; and
based on a message to refuse a transmission of the control right being received from the first external device, periodically monitoring the event in which the control right of the first external device is lost.

15. The method as claimed in claim 14, further comprising:
based on the message to refuse the transmission of the control right being received from the first external device, transmitting an error message to the second external device.

16. The method as claimed in claim 9, wherein the transmitting the information comprises:
based on a plurality of access signals to connect the plurality of external devices being received from the plurality of external devices while the media signal corresponding to the content is processed, setting priority to the plurality of external devices in order by a reception time of the plurality of access signals; and
based on an event in which an external device which currently has a control right loses the control right occurring, transmitting the control right to an external device of a subsequent rank according to the priority.

17. The electronic apparatus as claimed in claim 1, wherein the processor is further configured to:
based on to the access signal being received from the second external device via the communicator, transmit, to the first external device, a notification message notifying of access attempt by the second external device, and
in response to a message to approve a transmission of the control right being received from the first external device via the communicator, transmit the control right to the second external device according to the access signal,
wherein only a single device from among the first external device and the second external device controls the electronic apparatus, at any time.

18. The electronic apparatus as claimed in claim 17, wherein the processor is further configured to generate an alarm image comprising the notification message, which is to be output on a screen of the first external device and multiplex the alarm image with a video signal to generate transmission data and transmit the transmission data, via the communicator in a data channel, to the first external device.

19. The electronic apparatus as claimed in claim 17, wherein the processor is further configured to generate an alarm audio comprising the notification message, which is to be output as an audio signal via a speaker at the first external device and multiplex the alarm audio with an audio signal of contents to generate transmission data and transmit the transmission data, via the communicator in an audio channel to the first external device.

* * * * *